(12) United States Patent
Thombre et al.

(10) Patent No.: US 10,592,506 B1
(45) Date of Patent: *Mar. 17, 2020

(54) QUERY HINT SPECIFICATION

(71) Applicant: Amazon Technologies, Inc., Reno, NV (US)

(72) Inventors: Neil Thombre, Santa Clara, CA (US); Zelaine Fong, San Carlos, CA (US); Stefano Stefani, Issaquah, WA (US); Hakan Jakobsson, San Francisco, CA (US); Anurag Windlass Gupta, Atherton, CA (US)

(73) Assignee: Amazon Technologies, Inc., Seattle, NV (US)

( * ) Notice: Subject to any disclaimer, the term of this patent is extended or adjusted under 35 U.S.C. 154(b) by 249 days.

This patent is subject to a terminal disclaimer.

(21) Appl. No.: 13/766,683

(22) Filed: Feb. 13, 2013

(51) Int. Cl.
 *G06F 16/2453* (2019.01)

(52) U.S. Cl.
 CPC .................. *G06F 16/2453* (2019.01)

(58) Field of Classification Search
 CPC ......... G06F 17/30545; G06F 17/30932; G06F 17/30861; G06F 17/3033; G06F 17/30867; G06F 17/30008; G06F 17/30371; G06F 17/30575; G06F 17/30463; G06F 17/30442; G06F 17/30466; G06F 17/30324; G06F 17/30917; G06F 17/30321
 See application file for complete search history.

(56) References Cited

U.S. PATENT DOCUMENTS

| | | | | |
|---|---|---|---|---|
| 5,666,442 A | * | 9/1997 | Wheeler | G06F 17/30675 382/209 |
| 5,761,657 A | * | 6/1998 | Hoang | G06F 17/30463 |
| 5,822,749 A | * | 10/1998 | Agarwal | G06F 12/0866 |
| 6,397,206 B1 | | 5/2002 | Hill et al. | |
| 6,813,617 B2 | | 11/2004 | Wong et al. | |
| 6,957,210 B1 | * | 10/2005 | Ramesh | G06F 17/30324 707/745 |
| 7,092,954 B1 | * | 8/2006 | Ramesh | G06F 17/30498 707/714 |
| 7,440,935 B2 | | 10/2008 | Day et al. | |
| 7,630,958 B2 | | 12/2009 | Day et al. | |
| 7,685,101 B2 | | 3/2010 | Day et al. | |

(Continued)

FOREIGN PATENT DOCUMENTS

EP   1665102   6/2006

OTHER PUBLICATIONS

Fritchey. "Controlling Execution Plans with Hints". redgate Hub. Published Nov. 12, 2009. URL Link: https://www.red-gate.com/simple-talk/sql/perforrnance/controlling-execution-plans-with-hints/. Accessed Nov. 2018. (Year: 2009).*

(Continued)

*Primary Examiner* — Charles D Adams
*Assistant Examiner* — Irene Baker
(74) *Attorney, Agent, or Firm* — Robert C. Kowert; Kowert, Hood, Munyon, Rankin & Goetzel, P.C.

(57) ABSTRACT

A query optimizer may receive a query block that includes a hint. The hint may include a unique object identifier to specify an object to which the hint applies. In some instances, the object may correspond to a nested query block. A query optimization plan may be determined based, at least in part, on the hint. The query execution plan may then be executed to query a data store.

15 Claims, 4 Drawing Sheets

(56) References Cited

U.S. PATENT DOCUMENTS

| | | | |
|---|---|---|---|
| 7,739,263 B2* | 6/2010 | Das | G06F 17/30306 707/713 |
| 7,831,476 B2* | 11/2010 | Foster | G06Q 30/02 705/26.8 |
| 7,984,043 B1* | 7/2011 | Waas | 707/718 |
| 8,065,329 B2 | 11/2011 | Lei | |
| 8,190,595 B2 | 5/2012 | Bruno et al. | |
| 8,321,405 B2 | 11/2012 | Weissman et al. | |
| 8,332,388 B2 | 12/2012 | Chaudhuri et al. | |
| 8,370,362 B2* | 2/2013 | Szabo | 707/739 |
| 2005/0125398 A1* | 6/2005 | Das | G06F 17/30306 |
| 2006/0136368 A1* | 6/2006 | Young-Lai | G06F 17/30412 |
| 2006/0218123 A1* | 9/2006 | Chowdhuri et al. | 707/2 |
| 2007/0038595 A1* | 2/2007 | Ghosh | G06F 17/30463 |
| 2007/0038618 A1* | 2/2007 | Kosciusko | G06F 17/30306 |
| 2008/0082540 A1* | 4/2008 | Weissman | G06F 21/6227 |
| 2008/0091647 A1* | 4/2008 | Gao Zhong | G06F 17/30442 |
| 2009/0089268 A1* | 4/2009 | Benedikt | G06F 17/30929 |
| 2009/0327254 A1* | 12/2009 | Bruno | G06F 17/30312 |
| 2010/0114868 A1* | 5/2010 | Beavin | G06F 17/30463 707/718 |
| 2010/0250518 A1* | 9/2010 | Bruno | G06F 17/30386 707/718 |
| 2011/0022940 A1* | 1/2011 | King et al. | 715/229 |
| 2011/0093500 A1 | 4/2011 | Meyer et al. | |
| 2011/0307472 A1* | 12/2011 | Slezak et al. | 707/719 |
| 2012/0047126 A1* | 2/2012 | Branscome et al. | 707/714 |
| 2012/0323885 A1 | 12/2012 | Wang et al. | |
| 2013/0290293 A1* | 10/2013 | Weyerhaeuser | G06F 17/30433 707/714 |
| 2014/0029464 A1* | 1/2014 | Sebeni | H04L 1/0015 370/252 |
| 2017/0124276 A1* | 5/2017 | Tee | G06F 19/3418 |

OTHER PUBLICATIONS

Lewis. "qb_name". Oracle Scratchpad. Published Jun. 25, 2007. URL Link: https://jonathanlewis.wordpress.com/2007/06/25/qb_name/. Accessed Oct. 2018. (Year: 2007).*

Oracle. "Optimizer Hints". Oracle Database Performance Tuning Guide 10g Release 1 (10.1), ch. 17. Jun. 5, 2012 snapshot via Archive.org. URL Link: https://docs.oracle.com/cd/B12037_01/server.101/b10752/hintsref.htm. Accessed Oct. 2018. (Year: 2012).*

Plew et al. "Day 9: Creating and Maintaining Tables". Teach Yourself SQL in 21 Days, 2nd ed. SAMS Publishing. Originally published Jul. 1997. Jul. 23, 2007 snapshot via Archive.org. URL Link: http://www.dmc.fmph.uniba.sk/public_html/doc/sql/ch09.htm. Accessed Oct. 2018. (Year: 1995).*

Talebzadeh. "Query hints to override optimizer". Tech Target. Last published Aug. 2004. URL Link: https://searchdatacenter.techtarget.com/answer/Query-hints-to-override-optimizer. Accessed Nov. 2018. (Year: 2004).*

Tkachenko et al. "Optimizing Schema and Data Types". High Performance MySQL, 3rd Edition. chapter 4. ISBN: 9781449314286. Published Mar. 2012. URL Link: https://www.safaribooksonline.com/library/view/high-performance-mysql/9781449332471/. Accessed Oct. 2018. (Year: 2012).*

Tutorials Point. "SQL—Sub Queries". Dec. 5, 2012 snapshot via Archive.org. URL Link: https://www.tutorialspoint.com/sql/sql-sub-queries.htm. Accessed Oct. 2018. (Year: 2012).*

WhatIs.com. "columnar database". Tech Target. Dec. 14, 2012 snapshot via Archive.org. URL Link: https://searchdatamanagement.techtarget.com/definition/columnar-database. Accessed Oct. 2018. (Year: 2012).*

Taniar et al. "The use of hints in object-relational query optimization". Comput Syst Sci & Eng (2004), vol. 19, No. 6, pp. 337-345. URL Link: <https://pdfs.semanticscholar.org/65de/7086d8da70faffb24d8d68e8ab2421d46cb2.pdf>. Accessed Mar. 2019. (Year: 2004).*

"SQL" downloaded from http://en.wikipedia.org/wiki/SQL on Feb. 15, 2013 pp. 1-16.

"Query optimizer" downloaded from http://en.wikipedia.org/wiki/Query_optimizer on Feb. 15, 2013 pp. 1-4.

Hint (SQL) downloaded from http://en.wikipedia.org/wiki/Hint_(SQL) on Feb. 15, 2013 pp. 1-2.

"Query Optimization" downloaded from http://en.wikipedia.org/wiki/Query_optimization on Feb. 15, 2013 pp. 1-2.

U.S. Appl. No. 13/766,684, filed Feb. 13, 2013, Neil Thombre.

* cited by examiner

QUERY HINT SPECIFICATION

BACKGROUND

A query block is a statement used to perform a query of a database. At times, a query optimizer may make a non-optimal selection of a query execution plan resulting in slow query execution. Hints may be used to guide selection of a query execution plan to correct such a poor selection by the query optimizer.

In large complex SQL statements, it is difficult to specify optimizer hints for join order, join method, etc., particularly when a table may appear at multiple levels of select and subselect clauses. Additionally, many SQL statements are generated by business intelligence ("BI") tools or applications. It is also difficult to use query hints to change the optimizer plan generation for such queries because there is no access to the SQL generator.

Figure 1:
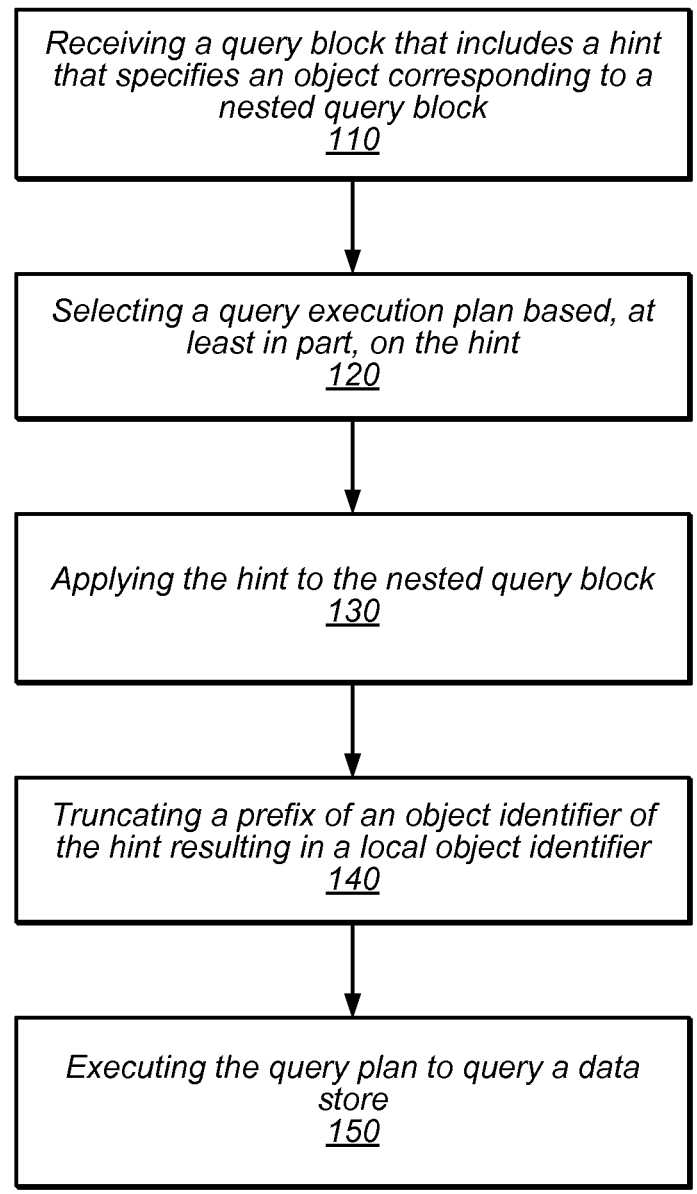
FIG. 1 is a flow diagram illustrating one embodiment of a method for query optimization.

Specific embodiments are shown by way of example in the drawings and will be described herein in detail. It should be understood, however, that the drawings and detailed description are not intended to limit the claims to the particular embodiments disclosed, even where only a single embodiment is described with respect to a particular feature. On the contrary, the intent is to cover all modifications, equivalents and alternatives falling within the spirit and scope of the present disclosure as defined by the appended claims. Examples of features provided in the disclosure are intended to be illustrative rather than restrictive unless stated otherwise.

The headings used herein are for organizational purposes only and are not meant to be used to limit the scope of the description. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a computer system may be configured to perform operations even when the operations are not currently being performed). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION OF EMBODIMENTS

Various embodiments of systems and methods for optimizing query execution are disclosed. Various ones of the present embodiments may include receiving a query block that includes a hint. The hint may include an object identifier (e.g., based on an unambiguous numbering scheme) to specify an object to which the hint applies. In some instances, the object may correspond to a nested query block, also referred to as a subquery block, of the query block. Such an object may be the actually nested query block or it may be an object within that nested query block. Various ones of the present embodiments may also include determining a query execution plan based, at least in part, on the hint. Various ones of the present embodiments may also include executing the query execution plan to query a data store.

In various embodiments, direct access to the query generator may not be available. For example, the query may be generated by a BI tool or some application. Various ones of the present embodiments may include receiving a query from a source that generated the query. Various ones of the present embodiments may also include applying a hint to the query, from outside the query, to optimize a query execution plan. In some instances, input that specifies both a query hint string and a hint may be received (e.g., to a hint specification user interface). Applying the hint may be based, at least in part, on the query hint string. For example, it may be determined (e.g., via regular expression, via a hashing technique, etc.) which query block of the query (or which queries of multiple queries) is associated with the query hint string. Upon such a determination, the hint may be applied to the determined query block. Various ones of the present embodiments may further include executing the query execution plan to query a data store.

The specification first describes a flowchart of one embodiment of a method for query optimization, followed by flowcharts for embodiments of a method for query optimization from outside the query. The specification then describes an example system that may implement the disclosed query optimization. Various examples are provided throughout the specification.

Figure 4:
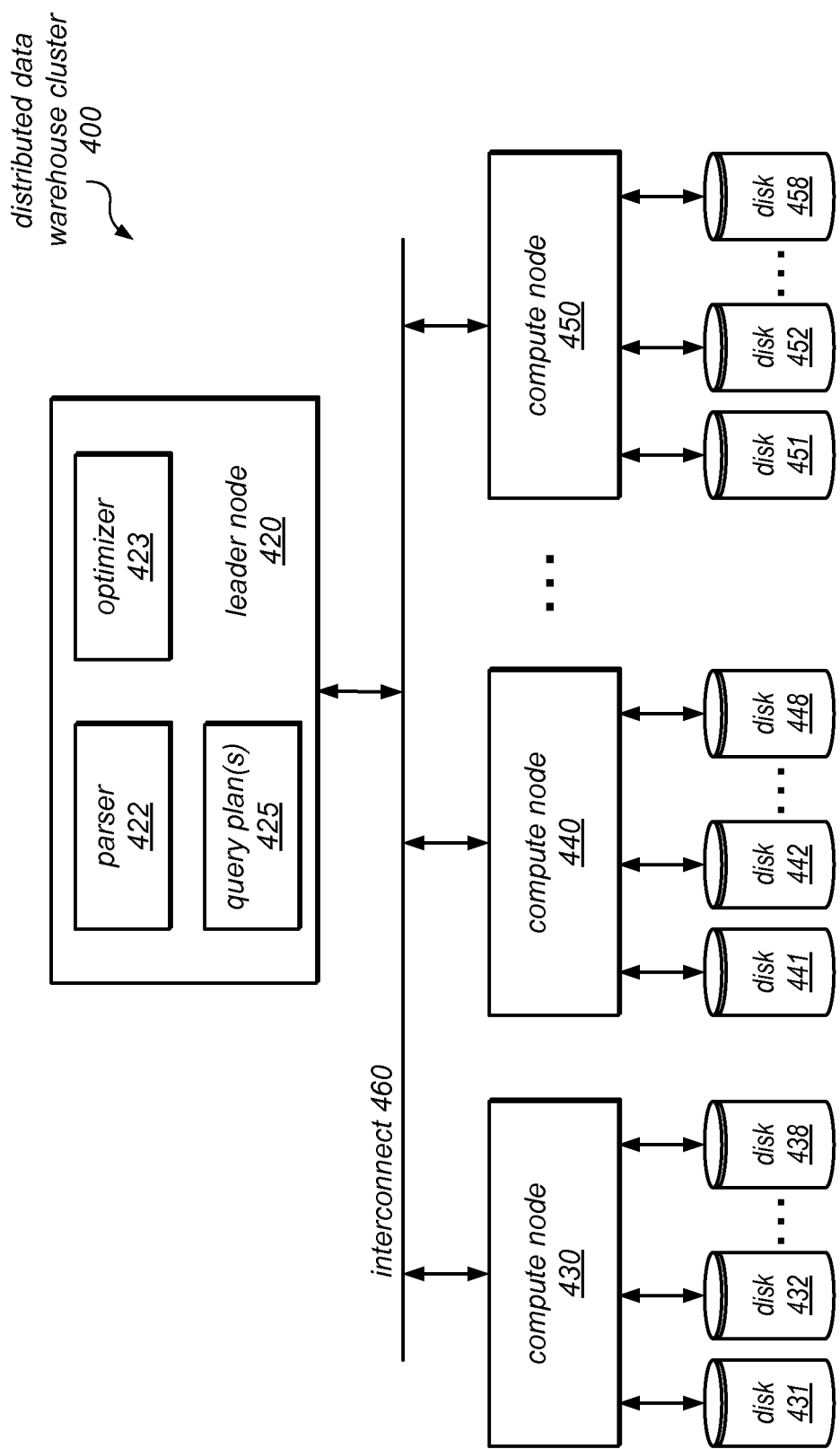
FIG. 4 is a block diagram illustrating a cluster in a distributed data warehouse system configured to implement the disclosed query optimization system, according to one embodiment.

Turning now to FIG. 1, one embodiment of a method for query optimization is depicted. While the blocks are shown in a particular order for ease of understanding, other orders may be used. In some embodiments, the method of FIG. 1 may include additional (or fewer) blocks than shown. Blocks 110-150 may be performed automatically or may receive user input. In one embodiment, the method of FIG. 1 may be performed by a query optimizer of a leader node of a distributed data warehouse cluster (e.g., an example of which is shown in FIG. 4) and/or one or more compute nodes of the distributed data warehouse cluster.

As shown at block 110, a query block may be received. A query block may be a statement (e.g., a SQL or other statement) that is used to perform a query on a data store. An example syntax for a query block is:
SELECT <expr_list> FROM <relation_list> WHERE <predicates> GROUP BY <group by list> ORDER BY <order by list> LIMIT;
A query block may itself include one or more query blocks. For instance, those one or more query blocks may be nested within a top level query block. The top level query block may be referred to as the outer query block, super query block, or simply as the query block. Nested query blocks may be referred to as subquery blocks, inner query blocks or nested query blocks. Note that a subquery block may also be a super query block relative to a subquery block within itself.

The query block may include a hint. The hint may be usable to guide selection/determination of a query execution plan for performing a query. For example, a hint may influence a query optimizer to choose a different query execution plan than the query optimizer would have chosen absent the hint. In one embodiment, hints may be treated as hints if they follow the appropriate syntax. As one example, hints may be treated as hints if they appears inside a C-style comment right after the SELECT when there is a '+' after the beginning '/*'. Otherwise, the hints may be ignored and treated as comments. Note that other syntax and formats may be used in other embodiments.

Hints may be classified into three categories: table/relation level hints (e.g., hints that are applicable to a single relation, such as specifying the cardinality of a table), query block level hints (e.g., hints that apply to a query block), and join level hints (e.g., hints that apply to a join operation between two operations).

Hints may also include arguments. A hint that does not accept any arguments (e.g., ORDERED, etc.) can be specified as is. A hint that accepts arguments can be specified like a function call (e.g., CARDINALITY (1, 20).

In general, tables in hints may be specified by their index numbers, which may be the order in which they appear in the FROM clause. Therefore, if any hint name takes the table number as an argument, it is the index of the table name that appears in the FROM clause in that query block. For example, consider the following FROM clause: FROM A, B, C. 1 represents table A, 2 represents table B, and 3 represents table C.

A variety of hints may be used in the disclosed techniques. As one example, CARDINALITY may be used to specify the cardinality of a table after all single table predicates for that table have been applied, thereby overriding what the optimizer thinks it should be. In one embodiment, CARDINALITY may take two arguments: a table number and cardinality (positive integer representing the number of rows).

Another example hint is NO_MERGE_JOIN, which may be used to suppress the use of MERGE JOIN for any joins in that query block. If the optimizer picks MERGE JOIN, then this hint may force the optimizer to use other join methods (e.g., HASH JOIN, NL JOIN, etc.)

Another example hint is ORDERED (without arguments), which may reinforce a join order, if possible. When ORDERED is specified, the first table in the FROM clause is joined with the second table first, then the result is joined with the third table and so on. Note that this hint has an everybody in or everybody out approach and will be ignored if there are any outer joins or in absence of any join predicates during any intermediate stage of the join ordering. Note also that ORDERED may only decide which table/subquery should be joined at each step of the join order decision process. It may still give the optimizer freedom to choose which is OUTER and which is INNER.

Another example hint is ORDERED (with arguments). This hint is similar to ORDERED (without arguments) except that the ordering sequence may be controlled other than how the tables appear in the FROM clause by specifying the indices of the tables. The number of arguments may be the number of tables/subqueries appearing in the FROM list. In addition to the restrictions noted above in the ORDERED (without arguments) example, this hint may be ignored if the number of arguments is not equal to the number of elements in the FROM list, if the table number does not make sense (e.g., out of bounds), or if any table number is repeated.

Another example hint is the HASH_JOIN, which may be used to enforce, when possible, a HASH JOIN method while joining two tables that are specified such that the first argument is the OUTER and the second is the INNER. This hint may be ignored if a hash join between the two specified tables is not possible.

Other example hints may include: DISTRIBUTE, PARTIAL_ORDER, NO_NL_JOIN, MERGE_JOIN, NO_HASH_JOIN, FACT, DIMENSION, MATERIALIZE, and NL_JOIN, etc.

In various embodiments, the hints may not be restricted to placement inside the query block to which is applies. To facilitate using hints for any part of a query, the hint may include an object identifier to specify an object (e.g., table, query block, etc.) to which the hint applies. As one example, the object to which the hint applies may correspond to a nested query block of the query block. Accordingly, in such an example, the object identifier may correspond to the nested query block. For instance, the object identifier may specify the nested query block or may specify an object of the nested query block (e.g., a table of the nested query block, a nested query block of the nested query block, etc.). The object identifier may uniquely specify both the nested query block and the object. In some examples, the object may be the nested query block such that the object identifier's specification of the nested query block may be the same as its specification of the object. The object identifier may be unique from other object identifiers such that the identifier is unambiguous. For example, the first table in a join hint in one query block may be uniquely identified such that its object identifier is different than the object identifier of the first table in a join hint in another query block.

In some embodiments, the object identifier may be specified from an unambiguous numbering scheme, in contrast to a scheme that uses table names or arbitrary numbers. Numbering may be specific to the scope of the flat query block. For instance, objects may be numbered sequentially as they appear to a parser inside a query block, starting with 1 in the FROM clause and then any query blocks that appear in the WHERE clauses and so forth. Objects inside the subquery blocks may be numbered with a prefix of the respective subquery block in which the object resides followed by a delimiter, such as '.'. One example unambiguous numbering scheme may be a dewey decimal based scheme. For example, all the first level query block objects in the FROM clause may be labeled with prefix 1 (e.g., 1#1, 1#2, 1#3, or 1.1, 1.2, 1.3, etc.). If there is a second query block, at the first level of nesting, then the FROM clause participants in that block will be numbered 2#1, 2#2, (or 2.1, 2.2), etc. If there is a subquery block under the second query block, then the FROM clause participants in that subquery block may be numbered 2.1#1, 2.1#2, (or 2.1.1, 2.1.2) etc. Several detailed examples follow.

A first example is a simple query block with two hints.
SELECT /*+ CARDINALITY (1, 200000) HASH_JOIN(2, 1) */count(*)
FROM lineitem, orders
WHERE l_orderkey=o_orderkey;

In this first example, the numbering of the objects is as follows. lineitem is 1 and orders is 2. The first hint is CARDINALITY (a table level hint) which takes the first argument as the object identifier and the second one as an integer. The second hint is HASH_JOIN, which is a join level hint. The HASH_JOIN takes two arguments, with those arguments being the object identifiers of the relations that are to be joined using the hash join. The first argument is the outer table and the second argument is the inner table. The lineitem table may be treated with cardinality of 200000 and orders and lineitem may be joined using hash join with orders as the outer table for the hash join.

A second example is an example of a nested query block.
SELECT /*+ CARDINALITY (2.1, 10) */ empno
FROM emp WHERE mgrno IN (SELECT empno FROM emp WHERE location='Bengazi');

In the second example, the numbering of objects is as follows. emp from the outer query gets an object identifier of 1. Next, the subquery block in the WHERE gets an object identifier of 2. Inside that subquery block, the object identifier numbering is 1 for the emp, which when specified from outside that subquery block becomes 2.1. The interpretation of the second example is to treat the emp that appears inside the subquery block specified in the WHERE clause as a table that has cardinality of 10. Note that the second example is equivalent to:
SELECT empno
FROM emp where mgrno IN (SELECT /*+ CARDINALITY (1, 10) */empno FROM emp WHERE location='Bengazi');

In the equivalent example, the hint is specified inside the subquery block and thus does not need to be qualified with a prefix.

In various embodiments, the object identifier (e.g., Dewey decimal based) system may be relative to the query block in which it appears and all other query blocks that are embedded inside it. Note, however, that it may not refer to objects outside of the query block in which is appears.

As part of query optimization, the hints may be chaperoned to the appropriate query blocks and the prefixes of the object identifiers may be truncated. Then, other optimization may occur after giving those chaperoned hints new local references for the object identifiers. Note that in the second and equivalent examples above, chaperoning the hint includes applying the hint to the query block to which it applies. Truncating the prefix of the object identifier in that example includes removing the "2." from "2.1" resulting in an object identifier in the CARDINALITY call as "1".

A third example is more complicated. For ease of explanation, the query is first illustrated without hints to better illustrate the numbering.
SELECT c1, c2
FROM T1,
    (SELECT c3, c4 FROM T2 where c5=5),
    (SELECT c6, c7, c8
    FROM (SELECT max(c9) as c6 FROM T3),
        T4)
WHERE (c8, c9) IN (SELECT DISTINCT c11, c12
    FROM T5,
        T6
    WHERE T5.a=T6.a);

T1 will be numbered as 1, the query block (SELECT c3, c4 FROM T2 where c5=5) will be 2. As a result, T2 will be 2.1. The query block (SELECT c6, c7, c8 FROM (SELECT max (c9) as c6 FROM T3), T4) will be 3. Thus, T4 will be 3.2, the query block (SELECT max (c9) as c6 FROM T3) will be 3.1, and T3 will be 3.1.1. The query block (SELECT DISTINCT c11, c12 from T5, T6 WHERE T5.a=T6.a) will be numbered 4, T5 will be numbered as 4.1, and T6 as 4.2.

The third example is now illustrated with hints:
SELECT /*+ CARDINALITY (1, 10), CARDINALITY (3.1.1, 5) HASH_JOIN (4.1, 4.2) */ c1, c2
FROM T1,
    (SELECT c3, c4 FROM T2 where c5=5),
    (SELECT c6, c7, c8
    FROM (SELECT max(c9) as c6 FROM T3),
        T4)
WHERE (c8, c9) IN (SELECT DISTINCT c11, c12
    FROM T5,
        T6
    WHERE T5.a=T6.a);

The effect of the hint is that, upon execution, T1's cardinality will be treated as 10, T3's cardinality as 5, and T5 and T6 will be joined using hash join with T5 as the outer table. The third example is equivalent to:
SELECT /*+ CARDINALITY (1, 10)*/ c1, c2
FROM T1,
    (SELECT c3, c4 FROM T2 where c5=5),
    (SELECT /*+ CARDINALITY (1.1, 5) */ c6, c7, c8
    FROM (SELECT max(c9) as c6 FROM T3),
        T4)
WHERE (c8, c9) IN (SELECT /*+ HASH_JOIN(1,2) */DISTINCT c11, c12
    FROM T5,
        T6
    WHERE T5.a=T6.a);

Or, when all the hints have been chaperoned to their respective query blocks to which they apply, the equivalent query is:
SELECT /*+ CARDINALITY (1, 10)*/ c1, c2

FROM T1,
   (SELECT c3, c4 FROM T2 where c5=5),
   (SELECT c6, c7, c8
   FROM (SELECT /*+ CARDINALITY (1, 5) */max(c9)
     as c6
     FROM T3),
   T4)
WHERE (c8, c9) IN (SELECT /*+ HASH_JOIN(1,2) */DISTINCT c11, c12
   FROM T5,
     T6
   WHERE T5.a=T6.a);

In some embodiments, clients/subscribers to the system may submit queries in a number of ways, e.g., interactively via a hint specification interface (e.g., an SQL interface) to the data warehouse system. In other embodiments, external applications and programs may submit queries using Open Database Connectivity (ODBC) and/or Java Database Connectivity (JDBC) driver interfaces to the data warehouse system.

In one embodiment, the query block may be received by a leader node of a data warehouse system in a cloud computing environment. In some embodiments, the data warehouse system may be an enterprise-class database query and management system that is highly scalable and extensible. It may provide fast querying capabilities over structured data, may provide integration with various data loading and ETL (extract, transform, and load) tools, may provide client connections with best-in-class business intelligence (BI) reporting, data mining, and analytics tools, and may be optimized for very fast execution of complex analytic queries such as those including multi-table joins, sub-queries, and aggregation. In some embodiments, queries may be distributed and parallelized across multiple physical resources (e.g., multiple compute nodes of the data warehouse system), and the data warehouse system may be scaled up or down on an as needed basis. The data warehouse system may work effectively with database schemas of various types and/or organizations, in different embodiments.

In some embodiments, the distributed data warehouse systems described herein may employ columnar storage for database tables. In other words, column information from database tables may be stored into data blocks on disk, rather than storing entire rows of columns in each data block (as in traditional database schemes). In some embodiments, storing table data in such a columnar fashion may reduce the overall disk I/O requirements for various queries and may improve analytic query performance. For example, storing database table information in a columnar fashion may reduce the number of disk I/O requests performed when retrieving data into memory to perform database operations as part of processing a query (e.g., when retrieving all of the column field values for all of the rows in a table) and may reduce the amount of data that needs to be loaded from disk when processing a query. Conversely, for a given number of disk requests, the column field values for many more rows may be retrieved than if each data block stored entire table rows. In some embodiments, the disk requirements may be further reduced using compression methods that are matched to the columnar storage data type. For example, since each block contains uniform data (i.e., column field values that are all of the same data type), disk storage and retrieval requirements may be further reduced by applying a compression method that is best suited to the particular column data type. In some embodiments, the savings in space for storing data blocks containing only field values of a single column on disk may translate into savings in space when retrieving and then storing that data in system memory (e.g., when analyzing or otherwise processing the retrieved data). For example, for database operations that only need to access and/or operate on one or a small number of columns at a time, less memory space may be required than with traditional row-based storage, since only data blocks storing data in the particular columns that are actually needed to execute a query may be retrieved and stored in memory.

In such embodiments in which a columnar database is used, columnar hints may also be employed. For example, for columnar hints, a second type of delimiter may be used to indicate the column number/offset in a relation/inline view for qualifying columns. For instance, if the first type of delimiter is a '.', then the second type may be '#'.

At 120, a query execution plan may be determined based, at least in part, on the hint. In some embodiments, determining the query execution plan may be performed by a leader node of a cluster of a distributed data store. In some embodiments, each cluster of a distributed data warehouse systems may include a leader node and multiple computing (compute) nodes (query engines), each of which is virtual machine having some amount of storage (e.g., multiple disks) and/or processing power. In some embodiments, once it is configured, a cluster may be directly visible by (and accessible to) a client/subscriber through a network address. In other words, a client/subscriber may connect directly to a cluster (e.g., to submit queries and receive responses to those queries) and may not have to go through a web server (or service) to access the cluster except to set up and manage the configuration of the cluster. In some embodiments, the leader node in each cluster (which may not store client/subscriber data) may maintain query plans (e.g., including schema information and/or metadata) for performing various types of queries on the data stored by the computing nodes in the cluster. Moreover, as described herein, an optimizer the leader node may determine those query plans, for example, based on one or more hints.

At 130, the hint may be applied to the nested query block corresponding to the object to which the hint applies. Applying the hint to the nested query block may also be referred to as chaperoning the hint. Such application of the hint may occur as part of a query rewrite in which the query is rewritten into internal data structures.

As shown at 140, a prefix of the object identifier of the hint may be truncated. The prefix may be an identifier of the query block from which the hint was relocated at block 130. The truncation of the prefix may result in a hint that includes a local object identifier. Examples of truncating the prefix are shown in the second and third examples above and their respective equivalent queries, which represent the query after truncation has occurred. For example, in the equivalent query of the second example above, the prefix "2." is truncated from "2.1" resulting in an object identifier of the relocated hint being just "1".

In some embodiments, it may be determined if various hints conflict prior to execution of a query execution plan. Consider an example in which the top level query block, or outer query block, includes a nested query block. The top level query block may include a hint and the nested query block may include another hint. In one embodiment, the leader node (e.g., the optimizer or parser of the leader node) may determine that the hint from the query block does not conflict with the hint from the nested query block. After such a determination, the hint and the other hint may be applied to the query block and nested query block, respectively. Additionally, the object identifier may be modified. For instance, a prefix or some other indicator of the nested hierarchy of a query block may be removed such that the object identifier is no longer relative to the outer query block.

As described herein, the hint may be used to optimize querying a data store resulting in a query execution plan. Using the hint to optimize querying the data store may include modifying the hint resulting in a modified hint (e.g., truncated prefix) and may also include applying the modified hint to the subquery block to which it applies.

As illustrated at 150, the query plan may be executed to query a data store. In some embodiments, the leader node may provide the query plan to be executed to one or more compute nodes. In one embodiment, the leader node of the given cluster may determine which compute node(s) currently store the data that is being requested by the query. Accordingly, the leader node may provide the query plan to the compute node(s) that currently store the data.

In one embodiment, within the leader node, a scheduler process may send query tasks (e.g., via a private network communication fabric) to the compute nodes for execution. For example, in one embodiment, the leader node may provide the query plan to one or more compute nodes to execute the query plan. In some embodiments, the distributed data warehouse improved performance may result from the use of massively-parallel processing (MPP) and the clustering of compute nodes that carry out the execution of the queries using a divide-and-conquer strategy.

In some embodiments, blocks 130 and 140 may not be performed. In other embodiments, blocks 130 and/or 140 may be performed before block 150.

The examples described herein illustrate hints as a comment in a SELECT query. Similar concepts to the disclosed techniques may apply equally to operations other than SELECT queries, such as INSERT, UPDATE, DELETE, etc.

In some embodiments, hints may be used in the method of FIG. 1 after the optimizer is unable to pick the right query execution plan. In such embodiments, statistics may be collected by using ANALYZE to determine whether the optimizer picked an incorrect plan.

Note that in some embodiments, a hint may not be honored if it does not make sense or tries to influence the plan in a way that is prohibited (e.g., by semantics) or is in conflict with other hints. As one example, if two valid hints are given for the same table, both hints may be ignored.

Figure 2:
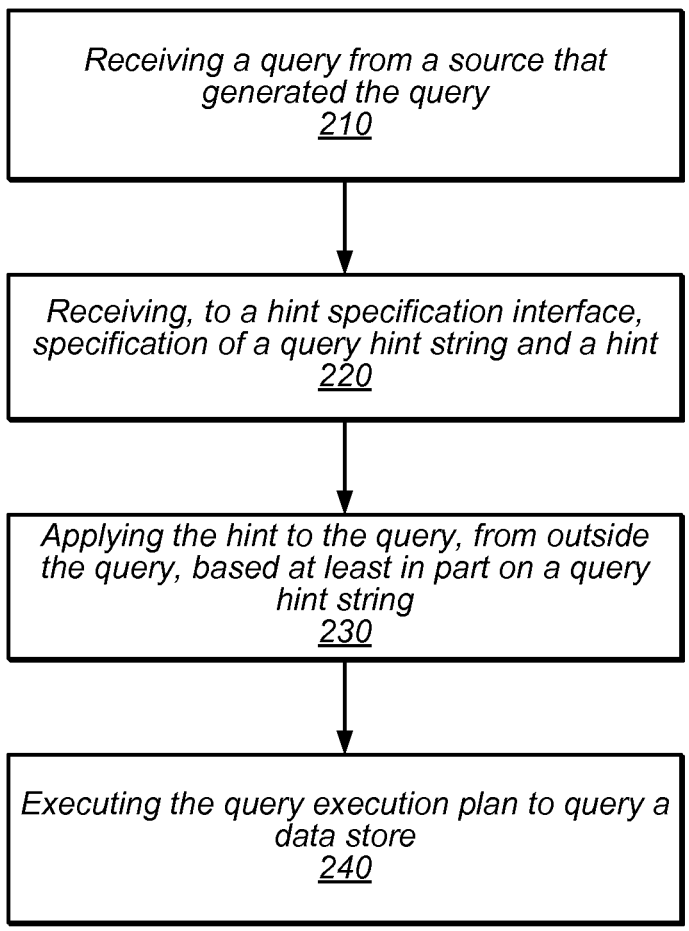
FIG. 2 is a flow diagram illustrating one embodiment of a method for query optimization from outside the query.

Turning now to FIG. 2, one embodiment of a method for query optimization is depicted. While the blocks are shown in a particular order for ease of understanding, other orders may be used. In some embodiments, the method of FIG. 2 may include additional (or fewer) blocks than shown. Additionally, in some embodiments, one or more blocks of FIG. 1 may be used in combination with one or more blocks of FIG. 2. Blocks 210-240 may be performed automatically or may receive user input. In one embodiment, the method of FIG. 2 may be performed by a leader node and/or one or more compute nodes of a distributed data warehouse cluster (e.g., an example of which is shown in FIG. 4).

As illustrated at block 210, a query may be received. The query may be received from a source that generated the query. For example, a business intelligence (BI) tool or some other application may generate the query such that a user may not have direct access to modify the query. In other embodiments, the user may have access to write/modify the query but may wish to apply a hint to the query from outside the query anyway (e.g., if the hint should apply to many query blocks such that a global application is more convenient, as an alternative to rerunning statistics when more data is added to the data store, etc.).

At 220, input that specifies a query hint string and a hint may be received (e.g., to a hint specification user interface). In one embodiment, the specification of the hint and the query hint string may include an association of the hint to the query hint string. For example, the query hint string, 'abcdefg' may be associated with a CARDINALITY hint. Examples of query hint strings and hints are described herein.

Figure 3:
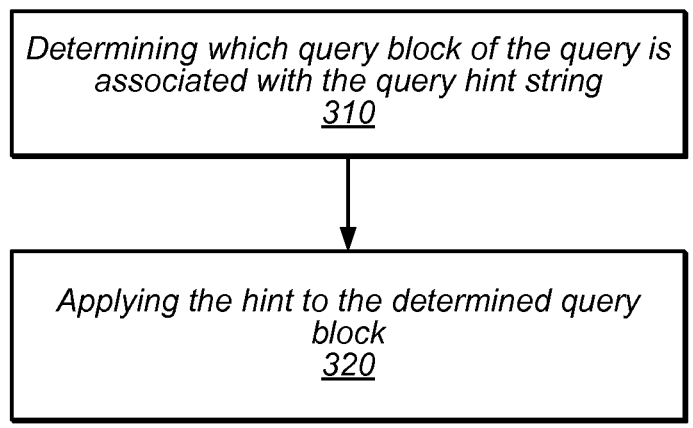
FIG. 3 is a flow diagram illustrating one embodiment of a method for modifying a query from outside the query.

As shown at 230, a hint may be applied to the query from outside the query. The hint may be applied to the query to optimize a query execution plan. Applying the hint may be based, at least in part, on the query hint string. FIG. 3 illustrates an example method for applying the hint to the query from outside the query. While the blocks are shown in a particular order for ease of understanding, other orders may be used. In some embodiments, the method of FIG. 3 may include additional (or fewer) blocks than shown. Blocks 310-320 may be performed automatically or may receive user input. In various embodiments, one or more blocks of FIG. 3 may be used in combination with one or more blocks of FIGS. 1 and/or 2.

At block 310, it may be determined which query block of the query is associated with the query hint string. Determining which query block is associated with the query hint string may include determining that an object matching the query hint string appears in the query block. Such a determination that an object matching the query hint string appears in the query block may include executing a regular expression that includes the query hint string. Execution of the regular expression may perform a search for the query hint string in the one or more query blocks of the query.

In one embodiment, determining that the query block is associated with the query hint string may be implemented with a hashing scheme. For example, a portion of the query (e.g., a query block) may be hashed and it may be determined if the hashed portion of the query matches a registered hash associated with the query hint string. In one embodiment, such a determination of a match may include searching a structure, such as a table, for a match.

In one embodiment, block 310 may be performed by a parser of a leader node. For example, when parsing a query (e.g., a SQL statement), the parse may parse the query and expand the SQL before running the regular expression(s) and/or hashing technique.

As shown at 320, the hint may be applied to the determined query block(s). In one embodiment, applying the hint to the query may include inserting the hint at the top level of the query. For a query having nested query blocks, the hint may be applied at the outermost query block regardless of which query block the hint applies to. For example, a hint at the top level of the query may apply to a nested/subquery block of the query, at any level of nesting. Note that the outermost query block may also referred to as the top level or super query block.

In some embodiments, applying the hint to the query may be performed for each of a plurality of query blocks of the query. As one example in which at least one of the query blocks is at a different level than another one of the query blocks, a query hint string may be the word "abcd." A regular expression may be executed to determine which query blocks (e.g., which object identifiers of which query blocks) of the query and/or which queries of multiple different queries include, or are otherwise associated, with "abcd." After execution of the regular expression, the hint that corresponds to query hint string "abcd" may be applied to the query blocks and/or queries that include the object identifier "abcd".

In one embodiment, as applying the hint may be performed for each of a plurality of query blocks of a query, it may be determined that multiple objects matching the query hint string appear in the query. Accordingly, the hint may be associated with each of those multiple matching objects to apply the hint to the multiple matching objects.

Turning back to FIG. 2, at 240, the query execution plan may be executed to query a data store, such as the distributed data warehouse described herein. In one embodiment, a leader node (e.g., parser and/or optimizer) of a cluster may perform blocks 210, 220, 230, 310, and/or 320 of FIGS. 2 and 3 and one or more compute nodes may execute the query execution plan at block 240.

Examples of specifying the hint from outside the query according to the methods of FIGS. 2 and 3 follow. Each of the examples may include the specified hint and query hint string, which may be received via a user interface. The specified hint and query hint strings may, in some embodiments, be stored and persist (e.g., in a .config file, etc.) A first example is:
SET HINT_FOR_QUERY ('3gadj4759fsnbfl136585jhfgek', 'CARDINALITY (1, 10), CARDINALITY (3.1.1, 5) HASH_JOIN (4.1, 4.2)');

The hint (e.g., second argument) is applied to a query (or portion of a query, such as a query block of the query) whose text, when passed through a hash function, results in the specified query hint string '3gadj4759fsnbfl136585jhfgek.' This effectively has a similar result to actually adding the hint string inside the query block of the query. For other queries that do not have a hash equal to the same hash value, the hint is not applied.

A second example is:

Example 2

SET HINT_FOR_REGEXP ('lineitem', 'CARDINALITY (#, 10)')

In the second example, any time the regular expression lineitem (e.g., the query hint string) is encountered in the FROM clause of a query, subquery, etc., the hint CARDINALITY is applied by substituting the '#' with its object identifier number. That way, while the hint is in effect, any time 'lineitem' table participates in a query, the optimizer may treat its cardinality as 10.

The methods described herein may in various embodiments be implemented by any combination of hardware and software. For example, in one embodiment, the methods may be implemented by a computer system that includes a processor executing program instructions stored on a computer-readable storage medium coupled to the processor. The program instructions may be configured to implement the functionality described herein (e.g., the functionality of various servers and other components that implement the query optimization systems described herein).

The disclosed techniques may permit a hint to be specified in a query block other than the query block to the hint applies. For example, the disclosed techniques may permit specification of hints for deeply nested query blocks or views. Moreover, the disclosed techniques may further permit specification of hints from outside of the query. Specification of hints from outside the query may allow hints to be applied to a large number of query blocks, as in a batch hint, such that a user may not have to specify the hint in each query block separately. Further, specification of hints from outside the query may permit specification of a hint when the query generator is not available, such as if a BI tool or other application generated the query. Additionally, specification of hints from outside the query may allow for guidance of a query in situations where data has been added but statistics have not yet been run on the new data.

FIG. 4 is a block diagram illustrating an example system that may be configured to implement the disclosed query optimization techniques. As illustrated, the example system is a cluster of a distributed data warehouse system. As illustrated in this example, a distributed data warehouse cluster 400 may include a leader node 420 and compute nodes 430, 440, and 450, which may communicate with each other over an interconnect 460.

As previously noted, distributed data warehouse system cluster 400 may include a single leader node server 420 that receives requests from various client programs (e.g., applications) and/or subscribers (users), then parses them and develops an execution plan to carry out the associated database operation(s). More specifically, leader node 420 may develop the series of steps necessary to obtain results for complex queries and joins. In some embodiments, the leader node may manage communications between the distributed data warehouse system and clients/subscribers, as well as communications with compute nodes 430-450 that are instructed to carry out database operations. For example, the compiled code may be distributed by leader node 420 to various compute nodes (e.g., nodes 430, 440, and 450) to carry out the steps needed to perform queries, and intermediate results of those queries may be sent back to leader node 420.

As described herein, leader node 420, including parser 422 and optimizer 423, may generate and/or maintain one or more query plans 425 for executing queries on distributed data warehouse cluster 400. The one or more query plans may be determined according to the techniques of one or more of the methods of FIGS. 1-3.

In some embodiments, distributed data warehouse system cluster 400 may also include one or more compute node servers, such as compute nodes 430, 440, and 450, and each may include individual query processing "slices" defined, for example, for each core of a server's multi-core processor. The compute nodes may perform the processing of queries by executing the compiled code of query execution plan 425, and may send intermediate results from those queries back to the leader node for final aggregation. Each core or slice may be allocated a portion of the corresponding node server's memory and disk space in order to process a portion of the workload for a query (or other database operation) that is sent to one or more of the compute node servers. In some embodiments, an interconnect network 460 in the cluster may provide private network communication using a standard or customer protocol, such as a custom User Datagram Protocol (UDP) to exchange compiled code and data between the leader node and the compute nodes.

In some embodiments, each of the compute nodes in a cluster implements a set of processes running on the node server's operating system that manage communication with the leader node, e.g., to receive commands, send back data, and route compiled code to individual query processes (e.g., for each core or slice on the node) in order to execute a given query. In some embodiments, each of compute nodes includes a superblock, which is a data structure (e.g., an array of data) whose entries store information (e.g., metadata about each of the data blocks stored on that node (i.e., one entry per data block). In some embodiments, each entry of the superblock data structure includes a unique ID for a respective block, and that unique ID may be used as a key to retrieve a copy of that data block in the remote key-value durable backup storage system). In some embodiments, the unique ID may be generated (and a corresponding entry in the superblock created) by the leader node or by a computing node when the data block is first written in the distributed data warehouse system.

As shown, each node in a distributed data warehouse cluster may include multiple disks on which data blocks may be stored on behalf of clients (e.g., users, client applications, and/or distributed data warehouse service subscribers). In this example, compute node 430 includes disks 431-438, compute node 440 includes disks 441-448, and compute node 450 includes disks 451-458. In some embodiments, a component of the distributed data warehouse cluster (or the distributed data warehouse system of which it is a component) may support load balancing, using any of a variety of applicable load balancing techniques. For example, in some embodiments, leader node 420 may include a load balancing component (not shown).

In various embodiments, the distributed data warehouse systems described herein may support a standard or custom application programming interface (API) for a variety of database operations. For example, the API may support operations for creating a database, creating a table, altering a table, creating a user, dropping a user, inserting one or more rows in a table, copying values, selecting data from within a table (e.g., querying a table), cancelling or aborting a query, and/or other operations.

In some embodiments, when a client request to perform a query or some other type of database operation is received (e.g., by leader node 420 in cluster 400), the distributed data warehouse system may spawn a new process to maintain session information for the client, and that process may be maintained as long as the client session remains open and that client is sending query requests to the leader node. The requested operation (a SQL query or some other database operation) may be routed through parser 422 and optimizer 423 to develop a query execution plan 425 to perform (e.g., based on the disclosed optimization techniques) or execute the specified query or database operation (i.e., the logical steps needed to perform the query). The query plan 425 may then be routed to the execution engine, which generates and compiles query execution code that leader node 420 and the compute nodes 430-450 will execute to complete the query. In some embodiments, each of the individual execution plan steps may be involve a simple operation or manipulation of data, to be performed by the compute nodes or the leader node, and the communication network connecting the leader node and compute nodes may be used to distribute intermediate results. In some embodiments, the distributed data warehouse system may achieve excellent query execution performance by separating query processes in each of multiple node slices in order to execute the compiled query code in parallel. In addition, the distributed data warehouse system may take advantage of optimized network communication, memory and disk management to pass intermediate results from one query plan step to the next, which may also help to speed query execution. In some embodiments, the last segment of a query may return the requested data. If the return set is to be aggregated or sorted, the compute nodes may each send a respective portion of the intermediate result to the leader node, which may then merge the returned data so that the final result of the query can be sent back to the requesting client/subscriber.

Figure 5:
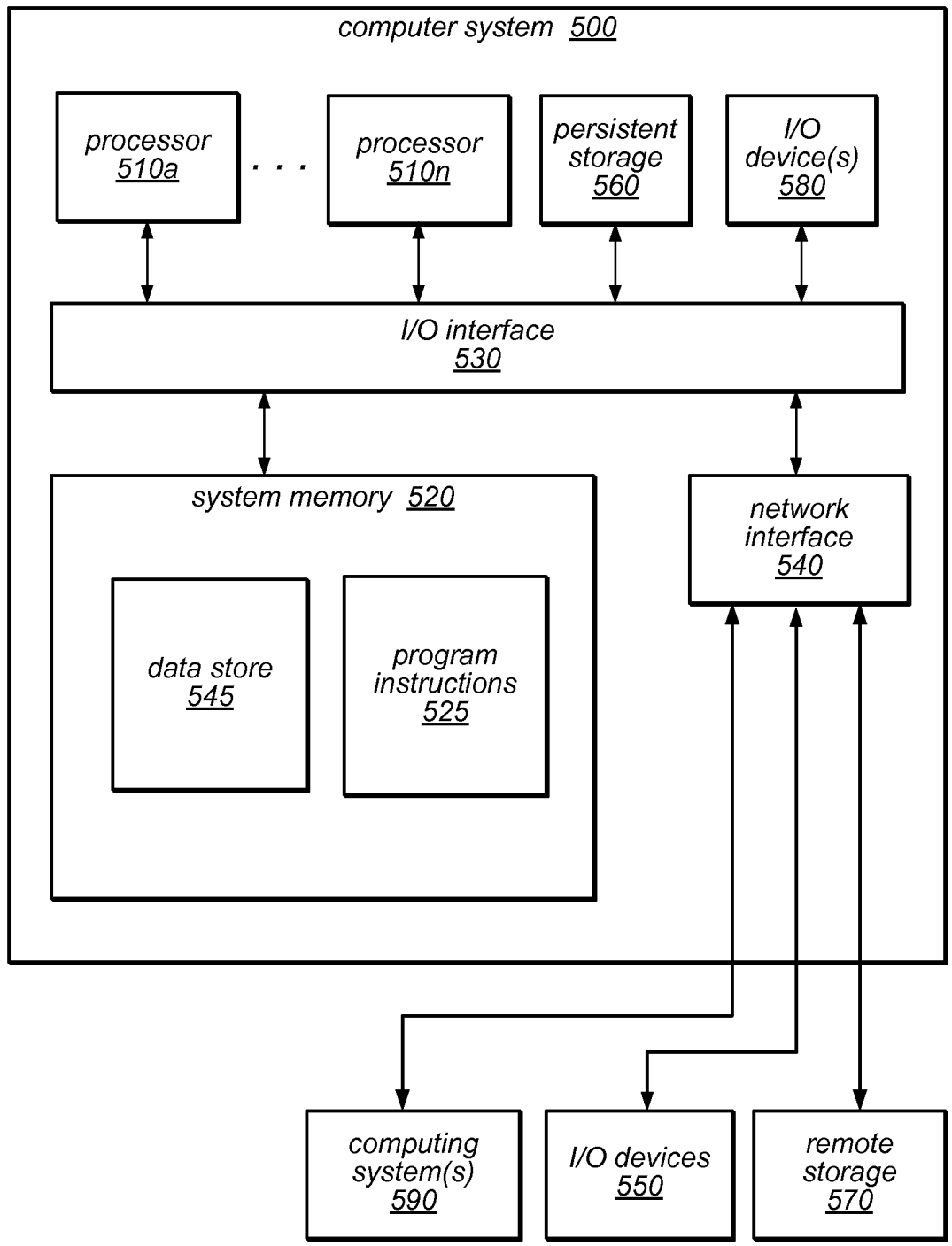
FIG. 5 is a block diagram illustrating a computer system configured to implement at least a portion of a query optimization system, according to various embodiments.

FIG. 5 is a block diagram illustrating a computer system configured to implement at least a portion of a query optimization system, according to various embodiments. For example, one or more computer systems 500 may be configured to implement a leader node of a cluster in a distributed data warehouse system, a compute node of a cluster in a distributed data warehouse system, and/or any other component of a query optimization system. Computer system 500 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 500 includes one or more processors 510 (any of which may include multiple cores, which may be single or multi-threaded) coupled to a system memory 520 via an input/output (I/O) interface 530. Computer system 500 further includes a network interface 540 coupled to I/O interface 530. In various embodiments, computer system 500 may be a uniprocessor system including one processor 510, or a multiprocessor system including several processors 510 (e.g., two, four, eight, or another suitable number). Processors 510 may be any suitable processors capable of executing instructions. For example, in various embodiments, processors 510 may be general-purpose or embedded processors implementing any of a variety of instruction set architectures (ISAs), such as the x86, PowerPC, SPARC, or MIPS ISAs, or any other suitable ISA. In multiprocessor systems, each of processors 510 may commonly, but not necessarily, implement the same ISA. The computer system 500 also includes one or more network communication devices (e.g., network interface 540) for communicating with other systems and/or components over a communications network (e.g. Internet, LAN, etc.). For example, a client application executing on system 500 may use network interface 540 to communicate with a server application executing on a single server or on a cluster of servers that implement a distributed system. In another example, an instance of a server application executing on computer system 500 may use network interface 540 to communicate with other instances of the server application that may be implemented on other computer systems.

In the illustrated embodiment, computer system 500 also includes one or more persistent storage devices 560 and/or one or more I/O devices 580. In various embodiments, persistent storage devices 560 may correspond to disk drives, tape drives, solid state memory, other mass storage devices, or any other persistent storage device. Computer system 500 (or a distributed application or operating system operating thereon) may store instructions and/or data in persistent storage devices 560, as desired, and may retrieve the stored instruction and/or data as needed.

Computer system 500 includes one or more system memories 520 that are configured to store instructions and data accessible by processor 510. In various embodiments, system memories 520 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 520 may contain program instructions 525 that are executable by processor(s) 510 to implement the methods and techniques described herein. In various embodiments, program instructions 525 may be encoded in platform native binary, any interpreted language such as Java™ byte-code, or in any other language such as C/C++, Java™, etc., or in any combination thereof. For example, in the illustrated embodiment, program instructions 525 include program instructions executable to implement the functionality of a leader node and one or more computer nodes of a cluster in a distributed data warehouse system, such as the disclosed query optimization techniques. In some embodiments, program instructions 525 may implement multiple separate clients, server nodes, and/or other components.

In some embodiments, program instructions 525 may include instructions executable to implement an operating system (not shown), which may be any of various operating systems, such as UNIX, LINUX, Solaris™, MacOS™, Windows™, etc. Any or all of program instructions 525 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 500 via I/O interface 530. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 500 as system memory 520 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 540.

In some embodiments, system memory 520 may include data store 545, which may be configured as described herein. For example, the information described herein as being stored by the data warehouse system (e.g., on a leader node or a compute node), such as a superblock data structure, one or more data block access counters, a query history, an error log, or other information used in performing the methods described herein may be stored in data store 545 or in another portion of system memory 520 on one or more nodes, in persistent storage 560, and/or on one or more remote storage devices 570, in various embodiments. In some embodiments, and at various times, system memory 520 (e.g., data store 545 within system memory 520), persistent storage 560, and/or remote storage 570 may store primary copies of data blocks, secondary copies (i.e., replicas) of data blocks, backup copies of data blocks, metadata associated with data blocks and/or their state, database configuration information, and/or any other information usable in implementing the methods and techniques described herein.

In one embodiment, I/O interface 530 may be configured to coordinate I/O traffic between processor 510, system memory 520 and any peripheral devices in the system, including through network interface 540 or other peripheral interfaces. In some embodiments, I/O interface 530 may perform any necessary protocol, timing or other data transformations to convert data signals from one component (e.g., system memory 520) into a format suitable for use by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example. Also, in some embodiments, some or all of the functionality of I/O interface 530, such as an interface to system memory 520, may be incorporated directly into processor 510.

Network interface 540 may be configured to allow data to be exchanged between computer system 500 and other devices attached to a network, such as other computer systems 590 (which may implement one or more server nodes and/or clients of the distributed data warehouse system and/or a remote key-value durable storage system), for example. In addition, network interface 540 may be configured to allow communication between computer system 500 and various I/O devices 550 and/or remote storage 570. Input/output devices 550 may, in some embodiments, include one or more display terminals, keyboards, keypads, touchpads, scanning devices, voice or optical recognition devices, or any other devices suitable for entering or retrieving data by one or more computer systems 500. Multiple input/output devices 550 may be present in computer system 500 or may be distributed on various nodes of a distributed system that includes computer system 500. In some embodiments, similar input/output devices may be separate from computer system 500 and may interact with one or more nodes of a distributed system that includes computer system 500 through a wired or wireless connection, such as over network interface 540. Network interface 540 may commonly support one or more wireless networking protocols (e.g., Wi-Fi/IEEE 802.11, or another wireless networking standard). However, in various embodiments, network interface 540 may support communication via any suitable wired or wireless general data networks, such as other types of Ethernet networks, for example. Additionally, network interface 540 may support communication via telecommunications/telephony networks such as analog voice networks or digital fiber communications networks, via storage area networks such as Fibre Channel SANs, or via any other suitable type of network and/or protocol. In various embodiments, computer system 500 may include more, fewer, or different components than those illustrated in FIG. 5 (e.g., displays, video cards, audio cards, peripheral devices, other network interfaces such as an ATM interface, an Ethernet interface, a Frame Relay interface, etc.)

It is noted that any of the embodiments described herein, or any of their components, may be implemented as one or more web services. For example, leader nodes within a data warehouse system may present data storage services and/or database services to clients as web services. In some embodiments, a web service may be implemented by a software and/or hardware system designed to support interoperable machine-to-machine interaction over a network. A web service may have an interface described in a machine-processable format, such as the Web Services Description Language (WSDL). Other systems may interact with the web service in a manner prescribed by the description of the web service's interface. For example, the web service may define various operations that other systems may invoke, and may define a particular application programming interface (API) to which other systems may be expected to conform when requesting the various operations.

In various embodiments, a web service may be requested or invoked through the use of a message that includes parameters and/or data associated with the web services request. Such a message may be formatted according to a particular markup language such as Extensible Markup Language (XML), and/or may be encapsulated using a protocol such as Simple Object Access Protocol (SOAP). To perform a web services request, a web services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

The invention claimed is:

1. A system, comprising:
a memory;
one or more processors coupled to the memory, wherein the memory comprises program instructions executable by the one or more processors to:
receive, by a parser, a query to a database, wherein the query specifies a hint and a query block, wherein the hint is usable to optimize the query, wherein the hint includes a unique object identifier uniquely specifying an object recited within the query block to which the hint applies, wherein the unique object identifier corresponds to a nested query block of the query block, and wherein the unique object identifier is relative to the query block;
determine, by an optimizer, a location of the specified object within the query block to which the hint applies according to an interpretation of the unique object identifier with respect to locations within the query block to locate the specified object in the query block, wherein the unique object identifier is specified from an unambiguous numbering scheme, the unambiguous numbering scheme corresponding to a specific scope of the query block in which objects are numbered sequentially inside the query block in an order of appearance to the parser;
obtain, by the optimizer, a local reference of the unique object identifier by truncating a prefix of the unique object identifier, wherein the truncated prefix is an identifier of the query block;
rewrite, by the optimizer, the query by inserting the hint at a top level of the determined query block location and replacing the unique object identifier in the hint with the local reference of the unique object identifier;

select, by the optimizer, a query execution plan to optimize the rewritten query based, at least in part, on the application of the hint to the specified object; and
execute, by a compute node, the query execution plan to perform the query to the database.

2. The system of claim 1, wherein the unique object identifier uniquely specifies both the nested query block and the object.

3. A method, comprising:
performing, by one or more computers:
receiving a query that specifies a hint and a query block, wherein the hint is usable to optimize the query, wherein the hint includes a unique object identifier uniquely specifying an object recited within the query block to which the hint applies, wherein the unique object identifier corresponds to a nested query block of the query block, and wherein the unique object identifier is relative to the query block;
determining a location of the specified object within the query block to which the hint applies according to an interpretation of the unique object identifier with respect to locations within the query block to locate the specified object in the query block, wherein the unique object identifier is specified from an unambiguous numbering scheme, the unambiguous numbering scheme corresponding to a specific scope of the query block in which objects are numbered sequentially inside the query block in an order of appearance to a parser;
obtain, by the optimizer, a local reference of the unique object identifier by truncating a prefix of the unique object identifier, wherein the truncated prefix is an identifier of the query block;
rewriting the query by inserting the hint at a top level of the determined query block location and replacing the unique object identifier in the hint with the local reference of the unique object identifier;
selecting a query execution plan to optimize the rewritten query based, at least in part, on the application of the hint to the specified object; and
executing the query execution plan to perform the query to a data store.

4. The method of claim 3, wherein the unique object identifier uniquely specifies both the nested query block and the object.

5. The method of claim 3, wherein the unique object identifier is unique from other object identifiers.

6. The method of claim 3, wherein the unambiguous numbering scheme is a Dewey decimal scheme.

7. The method of claim 3, wherein the data store is a columnar database, and wherein the hint is a columnar hint.

8. The method of claim 3, wherein said determining a query execution plan is performed by a leader node of a cluster of a distributed data store and wherein said executing the query execution plan is performed by one or more compute nodes of the cluster.

9. The method of claim 8, further comprising providing the determined query execution plan to the one or more compute nodes.

10. The method of claim 3, wherein the nested query block includes another hint, further comprising:
determining that the hint from the query block and the other hint from the nested query block do not conflict;
applying the other hint to the nested query block; and
modifying the unique object identifier.

11. A non-transitory computer-readable storage medium storing program instructions, wherein the program instructions are computer-executable to implement:
  receiving a query that specifies a hint and a query block, wherein the hint is usable to optimize the query, wherein the hint includes a unique object identifier uniquely specifying an object recited within the query block to which the hint applies, wherein the unique object identifier corresponds to a subquery block of the query block, and wherein the unique object identifier is relative to the query block;
  determining a location of the specified object within the query block to which the hint applies according to an interpretation of the unique object identifier with respect to locations within the query block to locate the specified object in the query block, wherein the unique object identifier is specified from an unambiguous numbering scheme, the unambiguous numbering scheme corresponding to a specific scope of the query block in which objects are numbered sequentially inside the query block in an order of appearance to a parser;
  obtaining a local reference of the unique object identifier by truncating a prefix of the unique object identifier, wherein the truncated prefix is an identifier of the query block;
  rewriting the query by inserting the hint at a top level of the determined query block location and replacing the unique object identifier in the hint with the local reference of the unique object identifier;
  selecting a query execution plan to optimize the rewritten query based, at least in part, on the application of the hint to the specified object; and
  executing the query execution plan to perform the query to a database.

12. The non-transitory computer-readable storage medium of claim 11, wherein rewriting the query further comprises:
  modifying the hint resulting in a modified hint, and applying the modified hint to the subquery block.

13. The non-transitory computer-readable storage medium of claim 11, wherein the hint includes the unique object identifier to reference the object to which the hint applies, wherein the unique object identifier specifies both the subquery block and the object.

14. The non-transitory computer-readable storage medium of claim 11, wherein the unambiguous numbering scheme is a Dewey decimal scheme.

15. The non-transitory computer-readable storage medium of claim 11, wherein said using the hint to query a database is performed by a leader node, wherein the program instructions are further computer-executable to implement providing the query execution plan to one or more compute nodes.

* * * * *